United States Patent Office 3,546,942
Patented Dec. 15, 1970

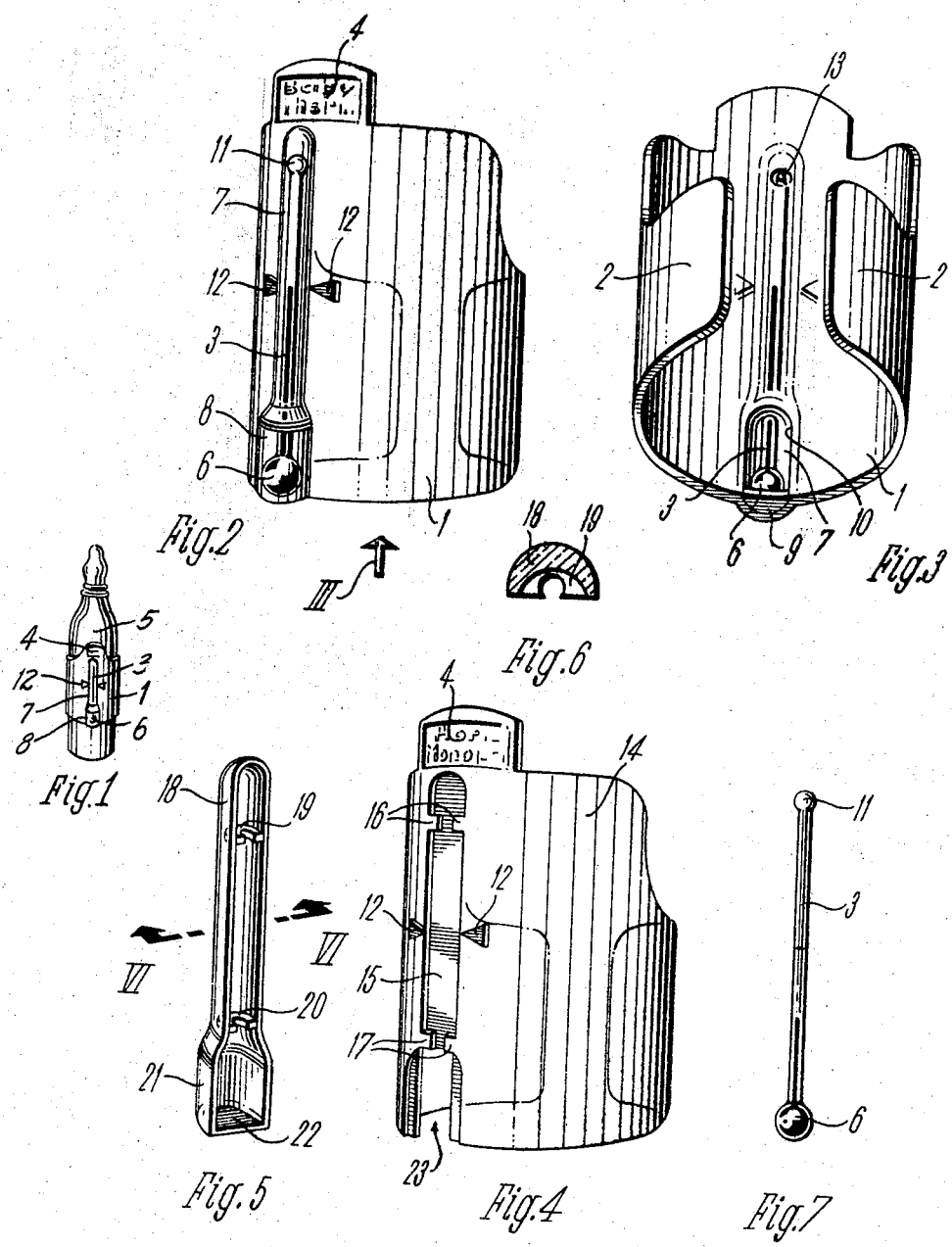

3,546,942
DEVICE FOR INDICATING THE TEMPERATURE OF A BABY BOTTLE
Walter Thiele, Weststrasse 57, Oberstdorf, Germany
Filed Aug. 6, 1968, Ser. No. 750,510
Int. Cl. G01k 1/14
U.S. Cl. 73—374                                    5 Claims

ABSTRACT OF THE DISCLOSURE

A holder for a thermometer for indicating the temperature of the contents of a baby bottle is provided with a cavity for receiving the thermometer. The thermometer is enclosed on all sides in the cavity, except for an opening facing the baby bottle, thereby protecting the thermometer in the cavity from mechanical stresses, while providing a heat-insulation chamber for the thermometer.

---

The present invention relates to a device for indicating the temperature of the contents of a baby bottle.

It has been found that it is very important for infants that they have their food at a temperature of almost exactly 36° C. As a rule, the baby food is first sterilized by boiling, preferably by heating the baby bottle in a water bath, after which the bottle with its contents is cooled under the water tap. To check the temperature of the contents of the bottle, mothers usually hold the baby bottle against their cheeks or eyes. This method of checking the temperature is very subjective and highly inaccurate. It is the object of this invention to develop a device for indicating the temperature of the contents of a baby bottle which provides for sufficiently accurate indication and which is of simple construction and easy to handle.

According to the present invention, this objective is achieved by an arrangement in which said device features an elastic holder which may be slid over the baby bottle and which mounts a thermometer indicating the temperature of the contents of the bottle.

The special advantage of the present invention resides in the fact that the elastic holder need only be fixed on the baby bottle when it is desired to measure the temperature of the contents of the bottle. This method of measuring the temperature is independent of any subjective influences and provides for reliable temperature indication. Furthermore, the extreme ease with which this device can be handled ensures that mothers will actually use it and that the baby will always have his food at the optimum temperature. The method of measurement meets the most exacting hygienic requirements, since there is no direct contact between the thermometer and the baby food. Temperature indication may be arranged in such a way as to allow for any possible loss of heat between the inner and outer surfaces of the bottle wall.

The elastic holder may be constructed in a number of different ways. For example, it may consist of clamps made of metal or plastic. It may, for example, take the form of a closed ring with an elastic diameter, e.g., made of coiled spring wire or the like, or the form of a ring of noncircular diameter. However, in one embodiment of the invention the holder takes the form of an open ring. This enables the holder to be manufactured in a particularly simple manner, e.g., from plastic. The open ends of the rings provide good elasticity even for rings made of plastic, thus enabling the device to be used on bottles of different diameters.

The holder is preferably provided with a cavity for the thermometer to protect the latter against damage.

The thermometer may be of various known constructions, e.g., a bimetallic thermometer or a substance changing its color in accordance with the temperature, although a capillary tube of a construction known per se which contains a liquid with a comparatively high thermal expansion coefficient is preferred. Such a thermometric capillary tube may be of the customary straight shape, in which case it will be fitted to the holder in such a manner as to run parallel to the generating lines of the bottle wall. The capillary tube may, however, also extend in a different direction, e.g., transversely to the generating lines, in which case it would be of a curved shape. This may be desirable to suit certain shapes which the holder may take. In either case it is desirable that the thermometric capillary tube be completely embedded in the holder.

If a straight capillary tube is used as thermometer, a satisfactory design may be achieved by making the ring higher than corresponds to the length of the capillary tube at the point where the thermometer is located and substantially lower at its ends. This will improve the elasticity of the ends.

A favorable arrangement is one in which the capillary tube is totally enclosed by the walls of the cavity, except for the bulb of the capillary tube, which should project through an opening in the holder so as to contact the outer surface of the baby bottle. For practical reasons, the capillary tube should be flexibly mounted in the holder, e.g., by bonding or welding it to the inner wall of the surrounding cavity at its upper end only.

The cavity may take the form of an opening in the holder, especially when the holder is made of plastic. This will enable the holder to be injection-molded in a single piece. In another embodiment of the invention, the cavity may be formed by subsequently attaching a trough-shaped component accommodating the thermometric capillary tube to a ring-shaped holder. This will somewhat simplify the construction of the mold for the holder.

In one embodiment of the invention, the holder and the thermometer may be boilable so that the baby food may first be brought to boiling temperature in a water bath, with the thermometer already in place on the bottle, and then be cooled to the temperature of 36° C. In order to make the capillary tube boilable, its upper end may be provided with a safety bulb in the form of an air chamber.

The cavity accommodating the capillary tube also assists the accumulation of heat so that the temperature is measured and indicated comparatively quickly. The bulb of the capillary tube may also be surrounded by a heat-conducting material which ensures a particularly rapid heat transfer from the bottle to the bulb of the capillary tube.

To enable the level of the liquid in the capillary tube to be read off with greater ease, it is advisable to mold a magnifying glass into the wall of the cavity, preferably by giving the outer wall of the cavity a cross-section corresponding to that of a bar-type lens.

It is an essential advantage of the present invention that its embodiments may be manufactured at extremely low cost without any sacrifice in reliability and accuracy.

Various embodiments of the invention are shown in the accompanying drawing, in which FIG. 1 shows a baby bottle with the device according to the invention in place on the bottle.

FIG. 2 is a front view of an embodiment of the invention drawn on a larger scale.

FIG. 3 is a rear view of the embodiment shown in FIG. 2.

FIG. 4 is a front view of part of a second embodiment of the invention.

FIG. 5 shows an individual component of said second embodiment of the invention.

FIG. 6 is a section taken along line VI—VI of FIG. 5.

FIG. 7 shows the capillary tube serving as thermometer.

The embodiments of the invention shown in the drawing feature an open ring component 1, the ends 2 of which are formed by elastic blades. At least in the vicinity of a thermometric capillary tube 3 does the height of the ring somewhat exceed the length of the thermometric capillary tube 3. At the elastic blades 2 the ring component 1 is lower than at the thermometric capillary tube 3. The ring component 1 features an advertising surface 4, which, for practical reasons, should project beyond the upper rim of the ring component 1 and which should be moulded integral with the ring component 1, if said ring component is made of plastic. In the latter case, this arrangement of the advertising surface affords the advantage that a plate carrying the advertising text and disposed in the injection mold of the ring component 1 is easy to replace.

The thermometric capillary tube 3 is attached to the ring component 1 in such a manner as to ensure an efficient heat transfer between a baby bottle 5 and the bulb 6 of the thermometric capillary tube. This attachment may be effected in various different ways. In the embodiment according to FIGS. 2 and 3, the ring component 1 is provided with a tubular cavity 7 to accommodate the thermometric capillary tube 3, said cavity featuring, at its lower end, an enlarged portion 8 to accommodate the bulb 6 of the capillary tube. In the region of the enlarged portion 8, the cavity is provided with an inward opening. The tubular portion of the cavity 7 is closed at the top. The thermometric capillary tube 3 is inserted through the lower, open end of the cavity 7. After said capillary tube has been secured in the cavity, the opening at the lower end of said cavity 7 is closed by a small plate 9, which may, for example, be cemented into said opening.

The thermometric capillary tube 3 is so secured in the cavity 7 that its bulb 6 slightly projects through the opening 10 in the ring component 1 at the lower end of said cavity 7, but in such a manner that said bulb 6 is free to yield elastically to the application of a load. This may be achieved, for example, by securing the thermometric capillary tube 3 in said cavity at its upper end 11 only, e.g., by bonding it with some adhesive substance to the ring component 1 or, if said ring component 1 is made of plastic, by welding it to said ring component 1. Thus, the thermometric capillary tube is protected on all sides and disposed within the cavity 7. To improve the heat transfer between the bottle 5 and the bulb 6 of the capillary tube, a substance which assists the transfer of heat, e.g., a metallic plate spring or a piece of metal sponge or the like, may be provided at said bulb 6 of the capillary tube. This is not necessary if the bulb 6 of the capillary tube is free to travel far enough to allow its circumference to pass through the opening 10 in the ring component 1 and to project slightly beyond the inner wall of the ring component 1 in an inward direction.

A mark 12 molded into the ring component 1 indicates the position which the level of the indicating liquid in the thermometric capillary tube assumes at a temperature of 36° C. This mark may be accentuated by a special color.

In the embodiment of the invention shown in FIGS. 2 and 3, the ring component 1 including the tubular cavity 7 consists of a single piece of injection-molded plastic, while in the embodiment shown in FIGS. 4 to 6 said ring component consists of two separate parts. At the point where the thermometric capillary tube 3 is to be installed in the ring component 14, said ring component 14 is provided with a recess 15 into which mounting lugs 16 and 17 project from the sides. A trough-shaped component 18, made of transparent plastic, features mounting webs 19 and 20 and, at its lower end, an enlarged portion 21. The end face 22 of the trough-shaped component is molded integral with said component.

The thermometric capillary tube 3 is secured in the trough-shaped component 18 with the aid of the mounting webs 19 and 20, after which said component 18 is inserted in the recess 15 and secured with an adhesive bond or by welding or the like. Again, the thermometric capillary tube is attached so that the bulb 6 of said capillary tube slightly projects through the opening 23 of the ring component 14.

As shown in FIG. 6, the wall of the trough-shaped component 18 has the cross-section of a magnifying lens, which makes it easier to read the level of the indicating fluid in the thermometric capillary tube 3.

When in use, the device according to the present invention is slid over a baby bottle so that the bulb 6 of the capillary tube contacts the outer wall of said bottle or approaches said wall very closely. The thermometric capillary tube will then indicate the temperature of the bottle which may be checked with the aid of the mark 12.

In one embodiment of the invention, the walls of the cavity totally enclose the capillary tube except for an opening at the bulb of the capillary tube, said bulb of the capillary tube being disposed at such a distance from the surface of the bottle as to prevent any manufacturing tolerances which may influence said distance from unduly affecting the thermometer readings. The heat accumulates in the housing which surrounds the bulb. This arrangement ensures highly consistent readings, even with large batches, without any need for adjustments or calibrations. The thermometer may be flexibly secured in a manner permitting it to yield radially to the application of a load.

What is claimed is:

1. A device for indicating the temperature of the contents of a baby bottle comprising a holder which may be slid over the baby bottle and which has a thermometer attached to it, a cavity provided in the holder, the walls of the cavity totally enclosing said thermometer except for an opening in the inner wall of the cavity facing the wall of said baby bottle, the bulb of the thermometer being arranged adjacent to said opening.

2. A device according to claim 1, wherein said bulb projects through said opening.

3. A device according to claim 2, wherein said thermometer is flexibly secured in said holder in a manner permitting it to yield in a radial direction with respect to said baby bottle.

4. A device as claimed in claim 3, wherein the thermometer is fixed at the upper end of its capillary tube to one of the walls of the cavity.

5. A device according to claim 1, wherein said bulb is arranged at a distance from the surface of the baby bottle.

References Cited
UNITED STATES PATENTS

| | | | |
|---|---|---|---|
| 1,377,578 | 5/1921 | Harris | 73—374 |
| 1,529,176 | 3/1925 | Florman | 73—374 |
| 2,246,241 | 6/1941 | Chaney et al. | 73—374 |
| 2,460,051 | 1/1949 | Welch | 73—374 |
| 3,433,076 | 3/1969 | Chaney | 73—374 |

FOREIGN PATENTS

| | | | |
|---|---|---|---|
| 814,124 | 3/1937 | France | 73—393.2 |

LOUIS R. PRINCE, Primary Examiner

W. A. HENRY II, Assistant Examiner

U.S. Cl. X.R.

73—343